US012671675B2

(12) United States Patent
Jercaianu et al.

(10) Patent No.: US 12,671,675 B2
(45) Date of Patent: **\*Jun. 30, 2026**

(54) SYSTEMS AND METHODS FOR ZERO TRUST DNS BASED NETWORKING

(71) Applicant: Microsoft Technology Licensing, LLC, Redmond, WA (US)

(72) Inventors: Alexandru Jercaianu, Redmond, WA (US); Thomas Alan Jensen, Redmond, WA (US); Ivan D. Pashov, Redmond, WA (US); Matthew Raymond Cox, Bothell, WA (US); Daniel Ring, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/499,887

(22) Filed: Nov. 1, 2023

(65) Prior Publication Data

US 2025/0141841 A1     May 1, 2025

(51) Int. Cl.
H04L 9/40 (2022.01)

(52) U.S. Cl.
CPC ...... H04L 63/0236 (2013.01); H04L 63/0435 (2013.01); H04L 63/20 (2013.01)

(58) Field of Classification Search
CPC . H04L 63/0236; H04L 63/0263; H04L 63/20; H04L 61/4511
See application file for complete search history.

(56) References Cited

U.S. PATENT DOCUMENTS

| | | |
|---|---|---|
| 7,251,694 B2 | 7/2007 | Gupta et al. |
| 7,296,155 B1 | 11/2007 | Trostle et al. |

(Continued)

FOREIGN PATENT DOCUMENTS

| | | |
|---|---|---|
| CN | 115499154 A | 12/2022 |
| WO | 2024081459 A1 | 4/2024 |

OTHER PUBLICATIONS

Biden Jr., Joseph .R. , "Executive Order on Improving the Nation's Cybersecurity", Retrieved from: https://www.whitehouse.gov/briefing-room/presidential-actions/2021/05/12/executive-order-on-improving-the-nations-cybersecurity/, May 12, 2021, 19 Pages.

(Continued)

*Primary Examiner* — Pramila Parthasarathy

(57) ABSTRACT

Examples of the present disclosure describe systems and methods for zero trust domain name system (DNS) (ZTDNS) based networking. A computing device implementing ZTDNS based networking blocks any outbound connections that are not included in a list of trusted IP addresses. The list of trusted IP addresses is updated in response to the computing device receiving from a trusted DNS server an IP address corresponding to a DNS request. In some examples, the ZTDNS based networking intercepts and evaluates outbound communications for applications that implement a custom application DNS client. In other examples, the ZTDNS based networking intercepts and evaluates outbound communications for virtual environments. The outbound communications for both the custom application DNS client and the virtual environments are proxied through a local DNS client of the computing device.

18 Claims, 10 Drawing Sheets

(56) References Cited

U.S. PATENT DOCUMENTS

| 7,299,491 B2 | 11/2007 | Shelest et al. | |
| 7,562,384 B1 | 7/2009 | Huang | |
| 7,945,666 B2 | 5/2011 | Wunner | |
| 8,935,748 B2 | 1/2015 | Statia et al. | |
| 11,799,860 B2 * | 10/2023 | Shah | H04L 67/30 |
| 12,101,291 B2 * | 9/2024 | Hu | H04L 61/59 |
| 2001/0042201 A1 | 11/2001 | Yamaguchi et al. | |
| 2003/0070067 A1 | 4/2003 | Saito | |
| 2003/0187882 A1 | 10/2003 | Jinmei et al. | |
| 2004/0039798 A1 | 2/2004 | Hotz et al. | |
| 2004/0143579 A1 | 7/2004 | Nakazawa | |
| 2004/0194102 A1 | 9/2004 | Neerdaels | |
| 2004/0250119 A1 | 12/2004 | Shelest et al. | |
| 2006/0167871 A1 | 7/2006 | Sorenson et al. | |
| 2007/0124487 A1 | 5/2007 | Yoshimoto et al. | |
| 2007/0150611 A1 | 6/2007 | Chan et al. | |
| 2009/0019523 A1 | 1/2009 | Takahashi et al. | |
| 2009/0043900 A1 | 2/2009 | Barber | |
| 2009/0055929 A1 | 2/2009 | Lee et al. | |
| 2009/0112814 A1 | 4/2009 | Statia et al. | |
| 2010/0049982 A1 | 2/2010 | Migault et al. | |
| 2019/0253385 A1 | 8/2019 | Gurney | |

OTHER PUBLICATIONS

International Search Report and Written Opinion received for PCT Application No. PCT/US2024/053304, mailed on Feb. 7, 2025, 16 pages.

Ateniese, et al., "A New Approach to DNS Security (DNSSEC)", Conference on Computer and Communications Security, Date: 2001, pp. 86-95, ACM, New York, USA.

Davidowicz, "Domain Name System (DNS) Security", Date: 1999, 10 Pages.

Final Office Action mailed on Dec. 14, 2016, in U.S. Appl. No. 14/594,340, 06 Pages.

Final Office Action mailed on May 25, 2011, in U.S. Appl. No. 11/980,928, 17 Pages.

Final Office mailed on Aug. 24, 2020, in U.S. Appl. No. 15/662,922, 37 Pages.

Final Office mailed on Aug. 25, 2021, in U.S. Appl. No. 15/662,922, 40 Pages.

Final Office mailed on Feb. 27, 2020, in U.S. Appl. No. 15/662,922, 36 Pages.

Non-Final Office Action mailed on Aug. 23, 2016, in U.S. Appl. No. 14/594,340, 07 Pages.

Non-Final Office Action mailed on Mar. 21, 2014, in U.S. Appl. No. 11/980,928, 16 Pages.

Non-Final Office Action mailed on Nov. 29, 2010, in U.S. Appl. No. 11/980,928, 18 Pages.

Non-Final Office mailed on Apr. 8, 2021, in U.S. Appl. No. 15/662,922, 49 Pages.

Non-Final Office mailed on Aug. 19, 2019, in U.S. Appl. No. 15/662,922, 35 Pages.

Non-Final Office mailed on Dec. 17, 2020, in U.S. Appl. No. 15/662,922, 44 Pages.

Non-Final Office mailed on May 6, 2020, in U.S. Appl. No. 15/662,922, 36 Pages.

Notice of Allowance mailed on Apr. 17, 2017, in U.S. Appl. No. 14/594,340, 08 Pages.

Notice of Allowance mailed on Aug. 26, 2014, in U.S. Appl. No. 11/980,928, 5 Pages.

Notice of Allowance mailed on Oct. 4, 2021, in U.S. Appl. No. 15/662,922, 08 Pages.

Rikitake, et al., "DNS Transport Size Issues in IPV6 Environment", Issue: 26-30, Date: Jan. 2004, pp. 141-145.

International Preliminary Report on Patentability received for PCT Application No. PCT/US2024/053304, mailed on May 15, 2026, 10 pages.

* cited by examiner

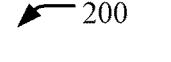
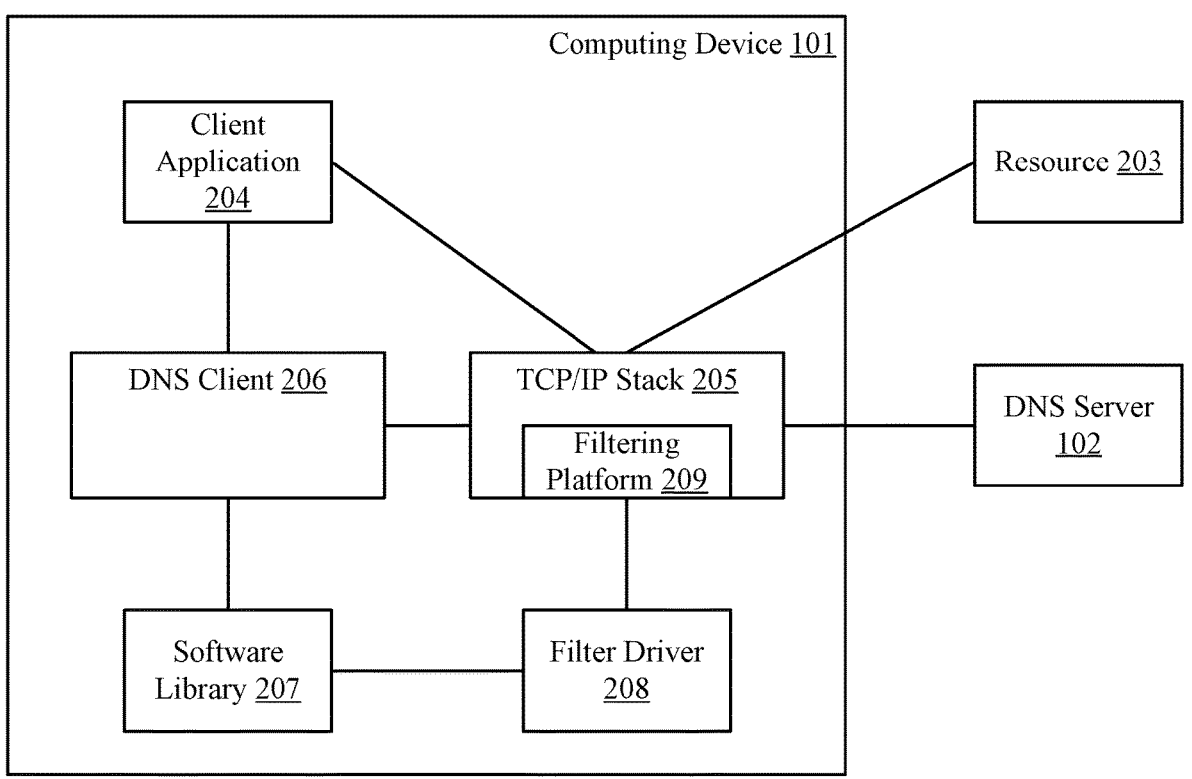
FIG. 2

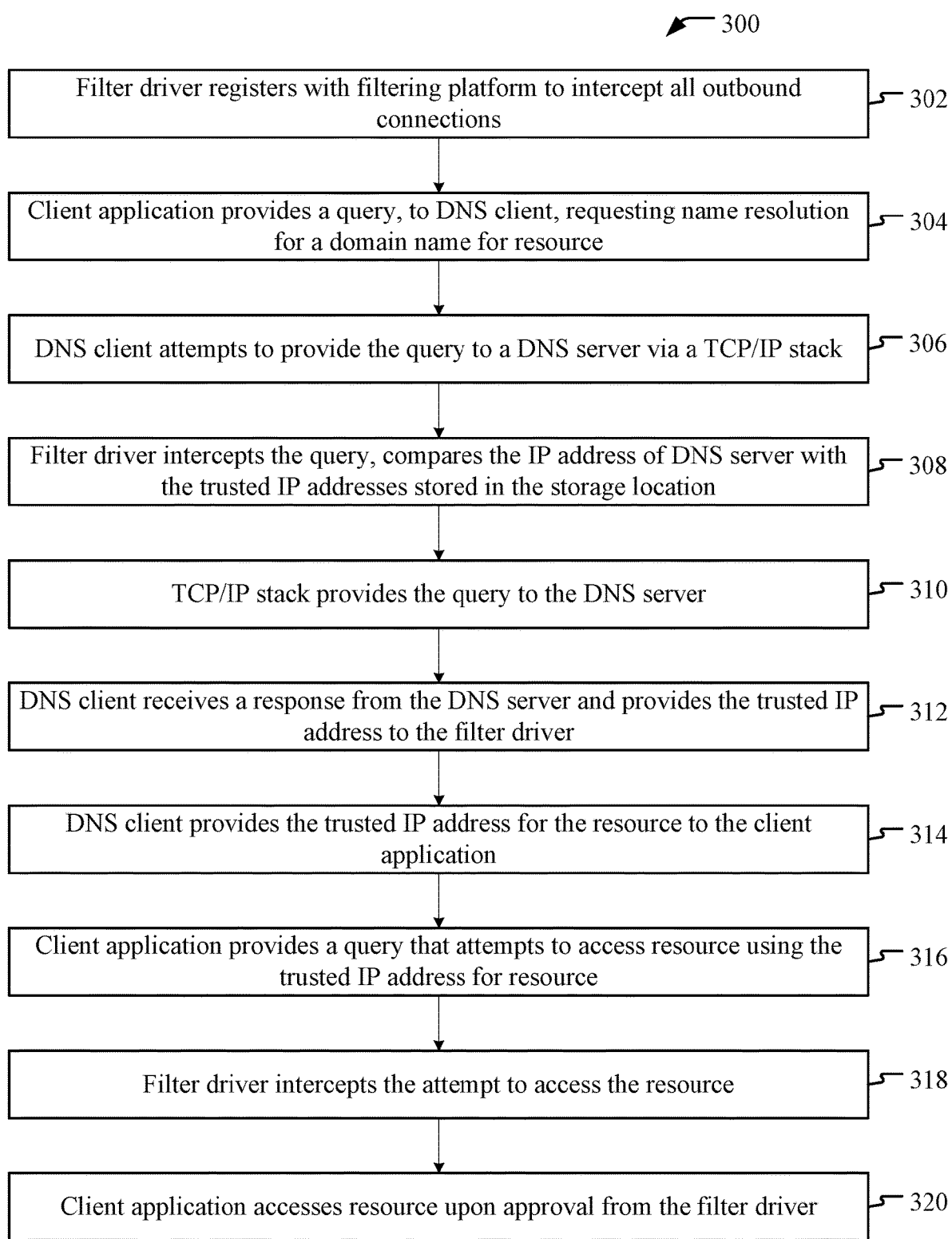

300

Filter driver registers with filtering platform to intercept all outbound connections — 302

Client application provides a query, to DNS client, requesting name resolution for a domain name for resource — 304

DNS client attempts to provide the query to a DNS server via a TCP/IP stack — 306

Filter driver intercepts the query, compares the IP address of DNS server with the trusted IP addresses stored in the storage location — 308

TCP/IP stack provides the query to the DNS server — 310

DNS client receives a response from the DNS server and provides the trusted IP address to the filter driver — 312

DNS client provides the trusted IP address for the resource to the client application — 314

Client application provides a query that attempts to access resource using the trusted IP address for resource — 316

Filter driver intercepts the attempt to access the resource — 318

Client application accesses resource upon approval from the filter driver — 320

FIG. 3

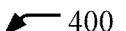
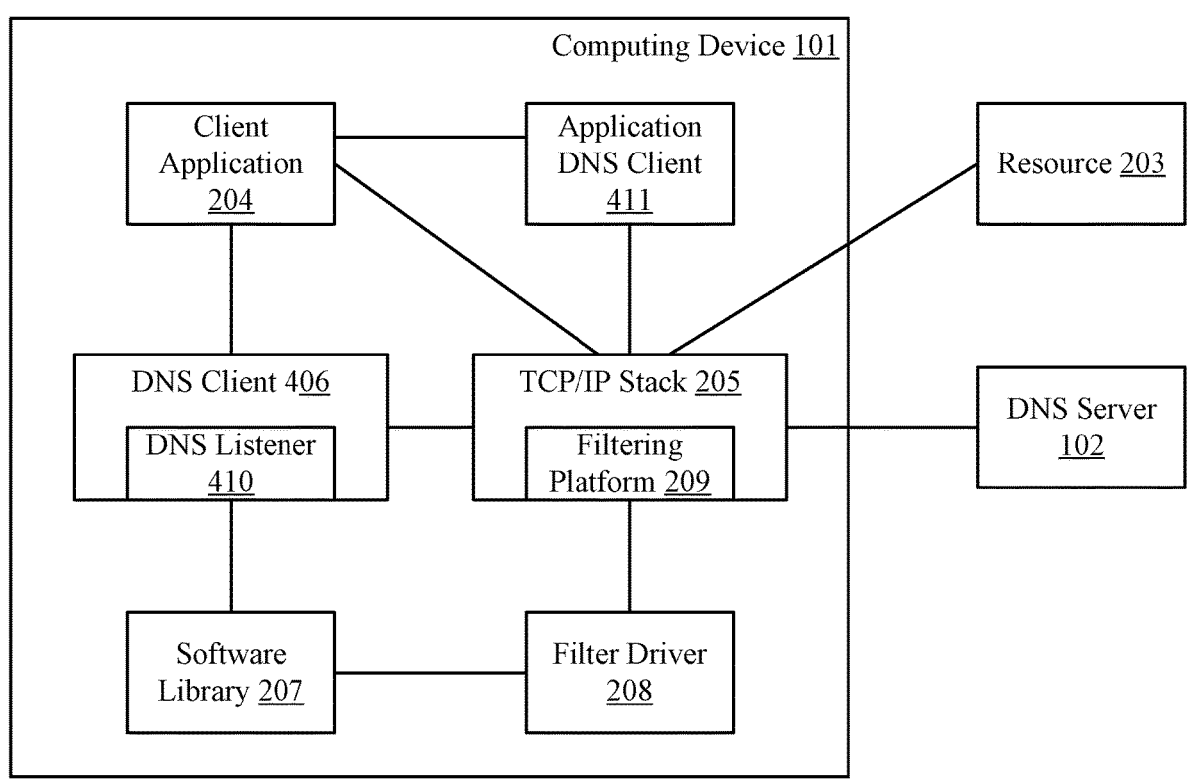
FIG. 4

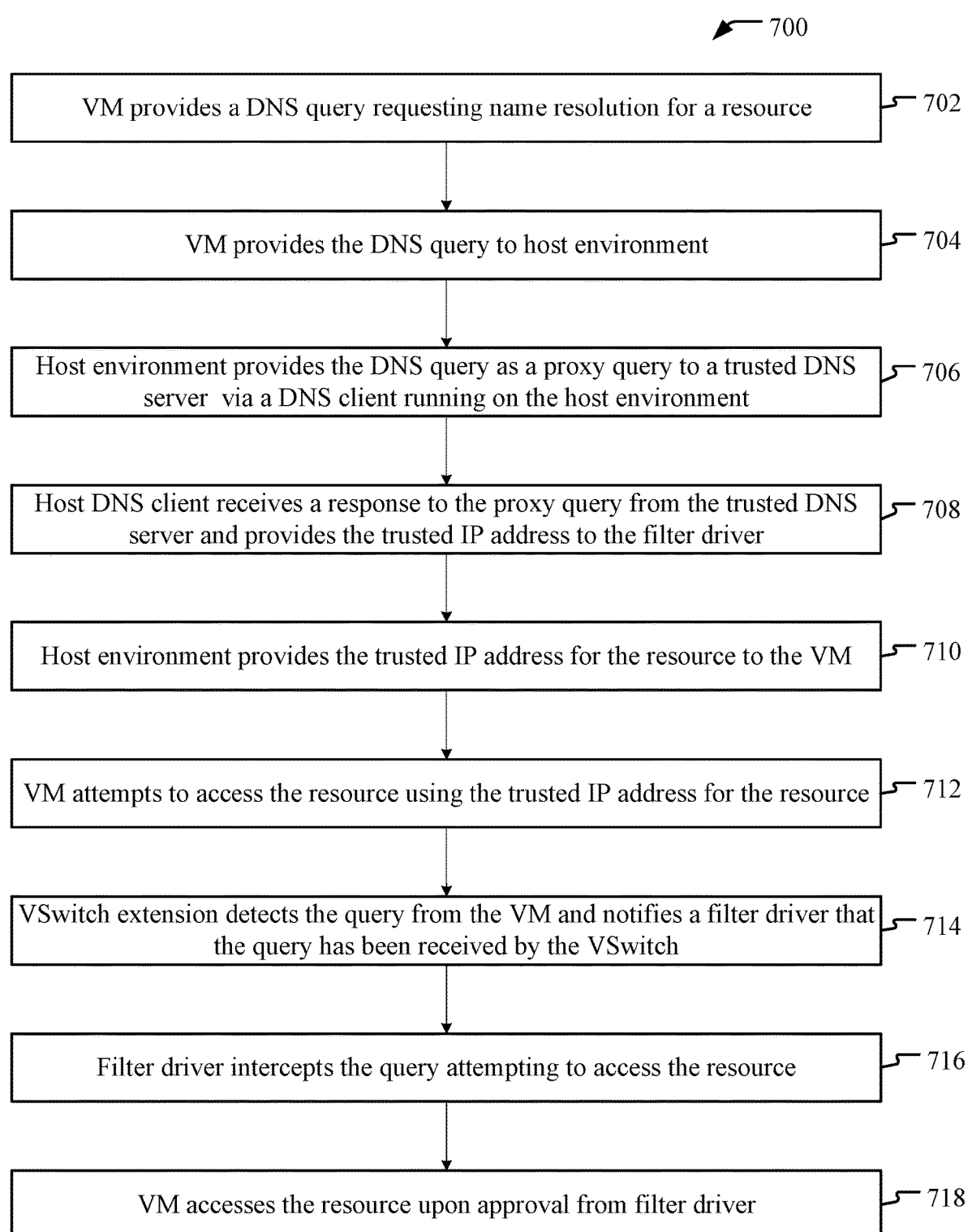

700

VM provides a DNS query requesting name resolution for a resource          702

VM provides the DNS query to host environment          704

Host environment provides the DNS query as a proxy query to a trusted DNS server  via a DNS client running on the host environment          706

Host DNS client receives a response to the proxy query from the trusted DNS server and provides the trusted IP address to the filter driver          708

Host environment provides the trusted IP address for the resource to the VM          710

VM attempts to access the resource using the trusted IP address for the resource          712

VSwitch extension detects the query from the VM and notifies a filter driver that the query has been received by the VSwitch          714

Filter driver intercepts the query attempting to access the resource          716

VM accesses the resource upon approval from filter driver          718

FIG. 7

SYSTEMS AND METHODS FOR ZERO TRUST DNS BASED NETWORKING

BACKGROUND

In the modern digital landscape, cybersecurity has become increasingly critical as cyber-attacks grow in frequency and complexity. These attacks pose an ongoing threat to individual privacy, corporate data, and national security.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for zero trust domain name system (DNS) (ZTDNS) based networking.

In some examples, a client application of a computing device provides a first query for a name resolution for a domain name of a resource. A DNS client of the computing device provides the first query to a trusted DNS server for the name resolution. The first query includes the domain name to be resolved and the internet protocol (IP) address of the trusted DNS server and is provided to the trusted DNS server using an encrypted connection. A filter driver of the computing device evaluates the IP address of the trusted DNS server to determine whether the IP address is stored in an internal lookup table. If the IP address of the trusted DNS server is stored in the internal lookup table, the filter driver approves the communication to the trusted DNS server. The DNS client receives a response from the trusted DNS server comprising a trusted IP address corresponding to the domain name of the resource. The DNS client provides the trusted IP address to the filter driver, which stores the trusted IP address in the internal lookup table. The DNS client then provides the trusted IP address to the client application. The client application provides a second query to access the resource using the trusted IP address. The filter driver evaluates the trusted IP address in the second query to determine whether the trusted IP address is stored in the internal lookup table. If the trusted IP address in the second query is determined to be stored in the internal lookup table, the filter driver approves the second query by allowing the client application to transmit information to and/or access the resource.

In other examples, a client application of a computing device provides a first query for a name resolution for a domain name of a resource. A first DNS client of the client application provides the first query to a DNS listener configured to be a local DNS server of the computing device. A second DNS client of the computing device intercepts the first query and provides the first query to a trusted DNS server using an encrypted connection. The second DNS client of the computing device receives a response from the trusted DNS server comprising a trusted IP address corresponding to the domain name of the resource. The second DNS client of the computing device provides the trusted IP address to a filter driver of the computing device, which stores the trusted IP address in an internal lookup table. The second DNS client then provides the trusted IP address to the first DNS client of the client application, which provides the trusted IP address to the client application. The client application provides a second query to access the resource using the trusted IP address. The filter driver evaluates the trusted IP address in the second query to determine whether the trusted IP address is stored in the internal lookup table. If the trusted IP address in the second query is determined to be stored in the internal lookup table, the filter driver approves the second query by allowing the client application to transmit information to and/or access the resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

FIG. 2 illustrates an example system diagram for implementing a ZTDNS in accordance with examples described herein.

FIG. 3 illustrates an example process for a system implementing a ZTDNS in accordance with examples described herein.

FIG. 4 illustrates an example system diagram for implementing a ZTDNS for a system that includes a custom application DNS client in accordance with examples described herein.

FIG. 7 illustrates an example process for a system implementing a ZTDNS in systems that utilize virtual environments in accordance with examples described herein.

DETAILED DESCRIPTION

Figure 1:
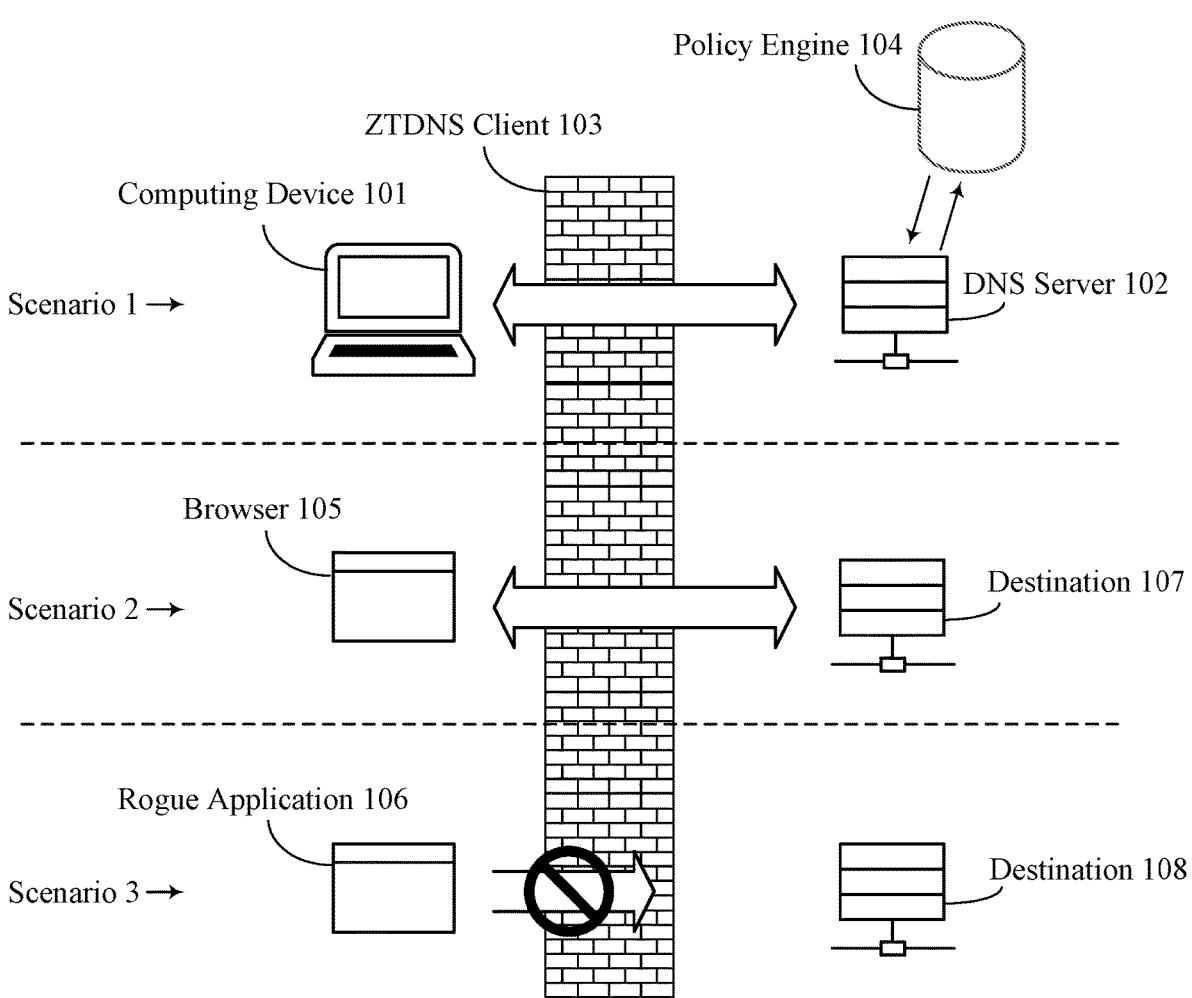
FIG. 1 illustrates an example system that implements a zero trust domain name system (DNS) (ZTDNS) in accordance with examples described herein.

In today's cybersecurity ecosystem, critical infrastructure constitutes a key vulnerability, presenting significant challenges in terms of both resilience and public trust. While these systems are integral to the functioning of society and the economy, they frequently operate on outdated or poorly secured platforms, making them susceptible to cyberattacks. The risks are not merely theoretical but have material consequences for public safety, national security, and economic stability. Traditional measures have largely been inadequate in securing critical infrastructure, often relying on piecemeal solutions that fail to address the systemic nature of the vulnerability. Moreover, the lack of harmonized regulations across sectors further muddles the landscape, complicating compliance and creating potential weak points that can be exploited by adversaries. A proactive and highly effective solution for addressing cybersecurity threats to critical infrastructure has been a long-felt but unsolved need, and previous solutions pursuant to these goals have proven unsuccessful.

One aspect of cybersecurity threats includes connections to malicious destinations (e.g., domain names or internet protocol (IP) addresses) from critical infrastructure. For example, outbound connections from organizational devices to malicious destinations may reveal sensitive data from the originating device, or otherwise grant a malicious user access to sensitive data from the originating device. A solution that prevents outbound connections to malicious destinations is thus desirable.

In accordance with examples described herein, the present application provides systems and methods for zero trust domain name system (DNS) (ZTDNS) based networking. A computing device (e.g., a client device) implementing ZTDNS based networking blocks outbound connections (e.g., acting as a firewall), with a few exceptions. Such exceptions include allowing access to a resource (e.g., network, domain, device, IP address, or file) that is trusted, or network traffic deemed essential for basic network connectivity. For instance, the exceptions may allow access to a trusted DNS server, trusted IP addresses stored at the computing device, and network traffic associated with Dynamic Host Configuration Protocol (DHCP) and Neighbor Discovery Protocol (NDP). A trusted resource is a resource that is recognized as secure and/or is expected to behave in accordance with a particular set of rules or policies. A resource may refer to a client resource (e.g., a resource associated with a client device or organization), a public resource, or a resource of a different client (e.g., a resource associated with a different organization, group, or person). All other outbound communications are blocked by default. A local DNS client at the computing device provides a DNS query to the trusted DNS server using an encrypted connection that implements encryption protocol, such as DNS over Hypertext Transfer Protocol Secure (HTTPS) (DoH), DNS over Transport Layer Security (TLS) (DOT), DNS over Quick User Datagram Protocol (UDP) Internet Connections (DoQ), DNSCrypt, etc. The trusted DNS server responds with a corresponding trusted IP address, which is then added to the list of stored trusted IP addresses.

In some examples, a client application on the computing device uses its own custom application DNS client that is different from the local DNS client discussed previously. Such custom application DNS clients are not aware of the ZTDNS, and thus attempt to communicate with various destinations or query untrusted DNS servers without the destination domain name and IP address being verified using the stored trusted IP addresses or the trusted DNS server. To solve this issue, the local DNS client implements a DNS listener that causes client applications to proxy their queries through the DNS listener. For example, a DNS query from the custom application DNS client is intercepted by the DNS listener, and a proxy query is transmitted to the trusted DNS server using an encrypted connection, as described above, on behalf of the client application.

In other examples, the computing device implements a virtual machine (VM) that is provided by a host environment of the computing device. However, VM traffic is not intercepted by the ZTDNS by default and would, thus, bypass ZTDNS policies. To solve this problem, the computing device implements one or more mechanisms to proxy, to the host environment, a DNS query initiated from the VM. The host environment provides the proxied DNS query to the trusted DNS server using an encrypted connection, as described above. The trusted IP address received from the trusted DNS server is stored in a list of trusted IP addresses in the host environment. The computing device implements a switch (e.g., virtual switch ("VSwitch")) extension that allows the ZTDNS to intercept outbound connections from VMs and gives the ZTDNS the chance to approve or reject the outbound connection based on the list of trusted IP addresses.

FIG. 1 illustrates a system that implements ZTDNS based networking. System 100, as presented, includes a combination of interdependent components that interact to form an integrated whole. Components of system 100 include hardware components or software components (e.g., application programming interfaces (APIs), modules, runtime libraries) implemented on and/or executed by hardware components of system 100. In some examples, components of system 100 are distributed across multiple processing devices or computing systems.

System 100 includes computing device 101, DNS server 102, ZTDNS client 103, policy engine 104, browser 105, rogue application 106, destination 107, and destination 108. Computing device 101 may implement browser 105 and/or rogue application 106, such that Scenarios 1-3 each describe different scenarios of communication between computing device 101 and a resource (e.g., DNS server 102, destination 107, and destination 108). The scale and structure of devices and environments discussed herein may vary and may include additional or fewer components than those described in FIG. 1 and subsequent figures. Although examples in FIG. 1 and subsequent figures will be discussed in the context of DNS resolution, the examples are equally applicable to other policy enforcement techniques, such as authorization and authentication techniques. Further, although one or more figures are discussed in the context of VMs, the examples are equally applicable to other virtualization techniques and virtual environments (e.g., containers).

Computing device 101 represents a personal computer ("PC"), a server device, a mobile device (e.g., smartphone or a tablet), or any other type of electronic processing device. Computing device 101 runs a ZTDNS client, and thus by default, outbound communications are blocked, with some exceptions. Exceptions include a trusted DNS server (e.g., DNS server 102), trusted IP addresses stored at computing device 101, and traffic deemed essential for basic network connectivity. In examples, computing device 101 is pre-configured to allow communications with one or more of these excepted entities. In at least one example, computing device 101 is provisioned with a certificate (e.g., a digital certificate) that allows DNS server 102 to verify the identity of computing device 101. A certificate refers to a file or an electronic password that proves the authenticity of a device or a user through the use of cryptography and/or the public key infrastructure (PKI).

DNS server 102 is a computing device that resolves human-readable domain names (e.g., www.site.gov) into IP addresses (e.g., 1.2.3.4), which facilitates the routing of data across networks. DNS server 102 stores or has access to a list of DNS records comprising, among other things, IP addresses. In response to DNS queries from devices, such as computing device 101, DNS server 102 provides the IP addresses (e.g., in the form of a DNS record) to the devices. IP addresses provided from DNS server 102 in response to a DNS query may be trusted IP addresses. In examples, DNS server 102 is located beyond a data boundary or organizational boundary that physically and logically separates computing device 101 from DNS server 102. In at least one example, DNS server 102 is provisioned with a certificate (e.g., a digital certificate) that allows computing device 101 to verify the identity of DNS server 102 (e.g., to verify that DNS server 102 is a trusted DNS server).

ZTDNS client 103 is software comprising one or more user-mode and kernel-mode components that, collectively, effectively act as a firewall on computing device 101. For instance, ZTDNS client 103 includes at least a software library, such as a dynamic link list (DLL), and a filter driver. The software library is a set of auxiliary functionalities representing an API surface that allows user-mode components, such as a DNS Client of computing device 101, to update the filter driver (e.g., to add or remove trusted IP addresses). The filter driver performs traffic enforcement (e.g., allows and blocks connections). In examples, ZTDNS client 103, by default, blocks all IP-based outbound traffic that is not specifically indicated as allowed. In some cases, some users of computing device 101 (e.g., an employee or a user having limited access rights) do not have sufficient privileges (e.g., administrative privileges) to access or alter the ZTDNS client. For example, administrative privileges for the ZTDNS client may be limited to the IT enterprise administrator or administrator group for client device 101.

Policy engine 104 is a software component that enables organizations to define, monitor, and enforce access rules for resources and data using a combination of network analytics and/or programmed rules to grant or deny permissions based on various factors, such as user role, device identity, device type, and workload labels. In examples, policy engine 104 stores policies for determining whether DNS server 102 is permitted to resolve a DNS query. For instance, policy engine 104 may store an allowlist of IP addresses (e.g., a list of trusted IP addresses) and/or a blocklist of IP addresses (e.g., a list of blocked or untrusted IP addresses).

Scenario 1 illustrates computing device 101 in communication with DNS server 102. Computing device 101 communicates with DNS server 102 using an encrypted connection to resolve a domain name (e.g., determine the IP address associated with the domain name). For example, computing device 101 determines that a local cache stored at the computing device 101 does not include the IP address for the domain name. However, the local cache does include the IP address of DNS server 102. ZTDNS client 103 verifies that the IP address of DNS server 102 is a trusted IP address. Computing device 101 uses the IP address of DNS server 102 to provide the domain name to DNS server 102 via a connection encrypted using DoH, DoT, DoQ, or DNSCrypt. Upon receiving the domain name, DNS server 102 accesses policy engine 104 to determine whether DNS server 102 is permitted to resolve the domain name. For instance, policy engine 104 may determine whether the domain name is included in a list of known, trusted, and/or approved domain names. If it is determined that the DNS server 102 is permitted to resolve the domain name, DNS server 102 provides a corresponding trusted IP address back to computing device 101. If it is determined that the DNS server 102 is not permitted to resolve the domain name, DNS server 102 does not provide a corresponding IP address and/or DNS server 102 provides an indication that the domain name is not trusted. Computing device 101, in some examples, stores the IP address in the local cache. As a result, future queries for the IP address may be processed without needing to communicate with DNS server 102. Additionally or alternatively, computing device 101 stores the trusted IP address and/or other information in the corresponding DNS record (e.g., the domain name or a mapping of the domain name to a trusted IP address) in a storage location (e.g., a lookup table, a file, or another data structure). As a result, future queries using the IP address are allowed by ZTDNS client 103.

Scenario 2 illustrates computing device 101 in communication with destination 107, which is identified by a trusted IP address. Computing device 101 communicates with destination 107 via browser 105 (or other applications or software/firmware implementations) to access a resource stored by or accessible via destination 107. Browser 105 is a software application used to access, retrieve, and display content, including web pages, images, video, and other files. In an example, ZTDNS client 103 determines that an IP address provided by browser 105 is included in a list of trusted IP addresses. In response, ZTDNS client 103 enables browser 105 to access the resource using the trusted IP address.

Scenario 3 illustrates computing device 101 attempting to connect with destination 108, which is identified by an untrusted IP address. Computing device 101 unsuccessfully attempts to communicate with destination 108 via rogue application 106 (or other untrusted or unauthorized applications or software/firmware implementations) to access a resource stored by or accessible via destination 108. Rogue application 106 is unauthorized software that either poses as legitimate software or is embedded within legitimate software and performs malicious activities without the user's knowledge or consent. In an example, ZTDNS client 103 determines that an IP address provided by rogue application 106 is not included in a list of trusted IP addresses. In response, ZTDNS client 103 prevents rogue application 106 from accessing the resource using the IP address.

FIG. 2 illustrates an example system diagram 200 for implementing ZTDNS based networking. System diagram 200 includes computing device 101, DNS server 102, and resource 203. Computing device 101 includes client application 204, Transmission Control Protocol/Internet Protocol (TCP/IP) stack 205, DNS client 206, software library 207, and filter driver 208. In examples, computing device 101 is preconfigured (e.g., by an administrator) with access information enabling computing device 101 to access one or more external, trusted locations. For instance, computing device 101 stores an IP address of a trusted DNS server. The IP address of the trusted DNS server may be stored by one or more of the above-enumerated components of computing device 101 or stored in a data store accessible to one or more of the above-enumerated components of computing device 101.

Client application 204 is a software program, such as browser 105, that connects to a computing device, service, or application to transmit data or to perform operations. For example, client application 204 may transmit DNS requests to a local DNS client, transmit resource access requests to various computing devices inside or outside of the computing environment of client application 204, and access and/or manipulate requested resources.

TCP/IP stack 205 includes protocols that control the transmission of data over a network. For example, TCP/IP stack 205 transmits DNS requests (e.g., for domain name resolution) to DNS server 102, resource access requests to resource 203, DNS records from DNS server 102 to DNS client 206, and content and/or metadata of resource 203 to client application 204. In some examples, TCP/IP stack 205 is divided into multiple layers, such as a link layer, an internet layer, a transport layer, and/or an application layer. Data being transmitted by computing device 101 is segmented, encapsulated with headers at one or more layers of TCP/IP stack 205, and transmitted to a destination IP address. The destination IP address reassembles the segmented data and de-encapsulates the data at the corresponding TCP/IP stack layers of the destination IP address to ensure reliable and ordered data communication between computing device 101 and the destination IP address. TCP/IP stack 205 includes filtering platform 209.

DNS client 206 is a software component that receives DNS queries from client application 204 and provides the DNS queries to DNS server 102 to request domain name resolution of domain names into IP addresses. DNS client 206 provides the DNS queries to DNS server 102 using an encryption protocol, which enables DNS client 206 to communicate with DNS server 102 using an encrypted connection. Although DNS client 206 is depicted as receiving DNS queries from client application 204, it is contemplated that DNS client 206 may receive DNS queries from all or a subset of the applications and services implemented by computing device 101. DNS client 206 receives DNS records corresponding to DNS queries back from DNS server 102. DNS client 206 unpacks the DNS records to identify trusted IP addresses for the DNS queries. DNS client 206 transmits the trusted IP addresses to software library 207 to be stored. DNS client 206 then transmits the trusted IP addresses to client application 204. In some examples, DNS client 206 includes or has access to a DNS cache service (not pictured). The DNS cache service stores IP addresses (e.g., recently accessed IP addresses) associated with domain names. DNS client 206 accesses the DNS cache to search for an IP address corresponding to a domain name in a DNS query.

Software library 207 includes code and data that is used by one or more programs and is loaded into memory when called by another program (e.g., DNS client 206). In examples, software library 207 runs as a user-mode component (e.g., runs in the user space of a process), rather than as a kernel-mode component, and thus has limited access to system resources and functionalities of computing device 101. Software library 207 implements (e.g., installs) filter driver 208 on computing device 101 by registering the filter driver 208 with TCP/IP stack 205. Software library 207 transmits trusted IP addresses received from DNS client 206 to filter driver 208 to be stored and/or evaluated.

Filter driver 208 is a software component that intercepts and modifies the behavior of operating system calls, data flows, or system resources to provide extended functionalities or perform analysis. In examples, filter driver 208 intercepts all outgoing IP-based communications from computing device 101. For instance, filter driver 208 intercepts IP-based communications sent by client application 204 to resource 203. Filter driver 208 may comprise a storage location comprising a list of trusted IP addresses or may have access to a storage location comprising the list of trusted IP addresses. For instance, filter driver 208 may have access to a database storing a lookup table comprising the list of trusted IP addresses. In some examples, the storage location is the same location as the data store that stores the IP address of the trusted DNS server. Filter driver 208 compares IP addresses provided in resource access queries from client application 204 with the IP addresses in the list of trusted IP addresses. If the IP address in a resource access query matches an IP address in the list of trusted IP addresses, filter driver 208 allows client application 204 to access the requested resource. However, if the IP address in a resource access query does not match any IP address in the list of trusted IP addresses, filter driver 208 prevents client application 204 from accessing the requested resource.

Filtering platform 209 includes a set of one or more API and system services that provide a platform for creating network filtering applications. Filtering platform 209 enables network traffic (e.g., outbound and/or inbound connections) to be filtered, intercepted, modified, or blocked prior to reaching an intended destination. Examples of other filtering platforms include transport driver interface (TDI) filters, network driver interface specification (NDIS) filters, and layered service providers (LSP). Filtering platform 209 may implement firewalls, intrusion detection systems, anti-virus programs, network monitoring tools, and/or parental controls. Filtering platform 209 enables filter driver 208 to define the types of network traffic and operations of interest to filter driver 208.

FIG. 3 illustrates an example process 300 for a system implementing ZTDNS based networking in accordance with system diagram 200. At operation 302, filter driver 208 registers with filtering platform 209 to intercept outbound IP-based connections from computing device 101. Upon registering with filtering platform 209, filter driver 208 is able to intercept outbound IP-based connections from computing device 101 (e.g., transmitted via TCP/IP stack 205).

At operation 304, client application 204 provides a query, to DNS client 206, requesting name resolution for a domain name for resource 203.

At operation 306, DNS client 206 attempts to provide the query to DNS server 102 via TCP/IP stack 205. The query includes the domain name for resource 203 and the IP address for the DNS server 102. DNS client 206 retrieves the IP address included in the query from a data store of computing device 101. In examples, DNS client 206 attempts to transmit the query to DNS server 102 using a DNS encryption protocol, such as DoH, DoT, DoQ, or DNSCrypt.

At operation 308, filter driver 208 intercepts the query (e.g., at TCP/IP stack 205), compares the IP address of DNS server 102 with the trusted IP addresses stored in the storage location, and allows or prevents the connection to the DNS server 102 based on the comparison. For example, if the IP address of DNS server 102 matches a stored IP address in the list of trusted IP addresses, filter driver 208 allows the connection to DNS server 102. However, if the IP address of DNS server 102 does not match a stored IP address in the list of trusted IP addresses, filter driver 208 disallows the connection to DNS server 102.

At operation 310, TCP/IP stack 205 provides the query to DNS server 102 using the DNS encryption protocol. DNS server 102 determines whether the domain name from the query corresponds to a trusted IP address and/or whether DNS server 102 is permitted to resolve the domain name. For example, DNS server 202 may access a policy engine, such as policy engine 104, comprising or having access to a mapping that correlates domain names to trusted IP addresses. The domain name in the query may be compared to a mapping to determine whether the mapping comprises a matching domain name. If a matching domain name is found in the mapping, the IP address mapped to the matched domain name is selected from the mapping. The DNS server includes the selected IP address as a trusted IP address in a response. If the domain name does not map to a trusted IP address, DNS server 102 does not provide a response back to TCP/IP stack 205, or DNS server 102 may provide a response that includes an error message or "not found"

message indicating that the domain name is not mapped to an IP address. Computing device 101, via TCP/IP stack 205, receives the response and provides the response to DNS client 206.

At operation 312, DNS client 206 receives the response from DNS server 102. The response comprises the trusted IP address for resource 203. DNS client 206 calls filter driver 208 to add the trusted IP address for resource 203 to the trusted IP addresses in the storage location. For example, DNS client 206 calls software library 207, which includes API wrappers around one or more input/output controls (IOCTLs) that communicate with the filter drive. Software library 207 provides the trusted IP address received from DNS client 206 to filter driver 208, which stores the trusted IP address in the storage location.

At operation 314, DNS client 206 provides the trusted IP address for resource 203 to client application 204. For example, DNS client 206 may provide a DNS record received from DNS server 102 to client application 204. The DNS record comprises, among other things, the trusted IP address for resource 203. Alternatively, DNS client 206 may unpack the DNS record received from DNS server 102 to identify the trusted IP address for resource 203 and provide the unpacked trusted IP address to client application 204.

At operation 316, client application 204 provides a query that attempts to access resource 203 using the trusted IP address for resource 203. For example, in response to receiving the trusted IP address, client application 204 may generate a query requesting access to resource 203. In some examples, the query includes information in addition to the trusted IP address, such as a port number that identifies a particular application or service on a system, a security protocol to be applied the access request, or a user or device credential (e.g., a username, an account name, or a password) for authorizing and/or authenticating the user or device.

At operation 318, filter driver 208 intercepts the attempt to access resource 203 (e.g., at TCP/IP stack 205). In some examples, filter driver 208 allows the connection upon verifying that the trusted IP address for resource 203 is included in the storage location. That is, filter driver 208 compares the query IP address for resource 203 with trusted IP addresses in the storage location. In other examples, filter driver 208 determines that the trusted IP address for resource 203 is not included in storage location. As a result, filter driver 208 disallows access to resource 203.

At operation 320, client application 204 accesses resource 203 based on the determination of filter driver 208. For example, client application 204 may access and/or manipulate resource 203 on a remote computing device (e.g., a web server or a data repository). Alternatively, client application 204 may retrieve resource 203 (or a copy thereof), store retrieved resource 203 locally on computing device 101, and access and manipulate retrieved resource 203 locally. In examples in which resource 203 is a device or a piece of equipment, client application 204 may provide a set of instruction or commands to resource 203 to cause resource 203 to perform one or more actions (e.g., perform a print operation, a movement or relocation operation, a locking or unlocking operation, or an alerting operation).

FIG. 4 illustrates an example system diagram 400 for implementing ZTDNS based networking for a computing device that includes a custom application DNS client. System diagram 400 includes computing device 101, DNS server 102, and resource 203. Computing device 101 includes client application 204, TCP/IP stack 205, DNS client 406, software library 207, filter driver 208, and application DNS client 411. TCP/IP stack 205 includes a filtering platform 209. DNS client 406 includes DNS listener 410 but is otherwise similar in functionality to DNS client 206.

DNS listener 410 is a software program that monitors for the occurrence of a specific event or set of events. In examples, DNS listener 410 is configured to receive domain name requests from DNS clients of applications executing on computing device 101, such as application DNS client 411. For instance, DNS listener 410 monitors TCP/IP stack 205 to detect DNS queries sent by client application 204. Upon detecting a DNS query, DNS listener 410 notifies DNS client 406 of the DNS query and/or provides the DNS query to DNS client 406.

Application DNS client 411 is a software component that receives DNS queries from client application 204. In examples, unlike DNS client 206, which may receive DNS queries from all or a subset of the applications and services implemented by computing device 101, application DNS client 411 receives DNS queries from a single client application. For instance, a first application DNS client 411 may facilitate domain name resolution for a first client application of computing device 101 and a second application DNS client 411 may facilitate domain name resolution for a second client application of computing device 101. Application DNS client 411 attempts to provide the DNS queries from client application 204 to DNS server 102 using a DNS encryption protocol to request domain name resolution of domain names into IP addresses. However, the DNS queries provided by application DNS client 411 are intercepted by DNS listener 410 as described above. Application DNS client 411 receives trusted IP addresses for DNS queries from DNS client 406. Application DNS client 411 then provides the trusted IP addresses to client application 204.

Figure 5:
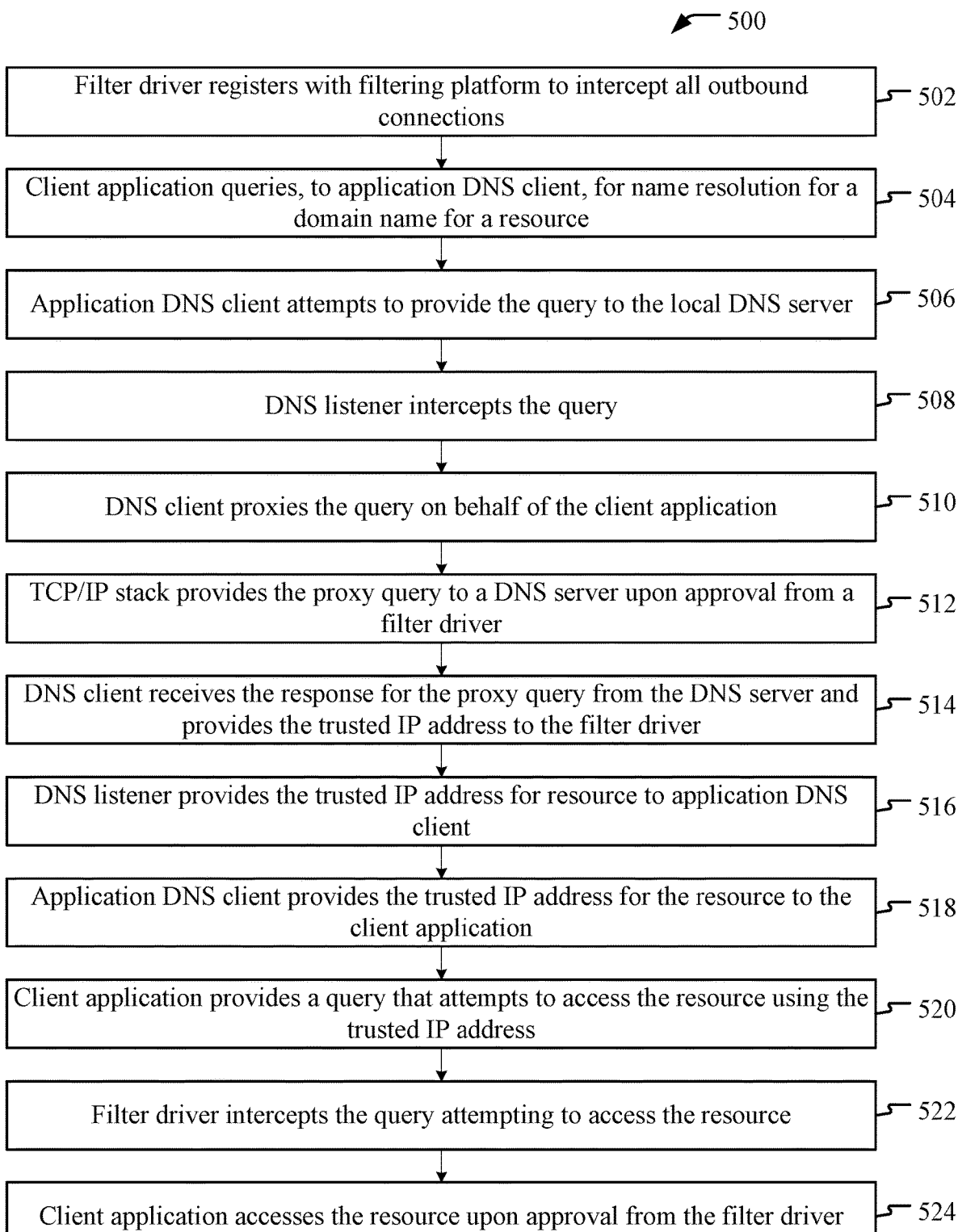
FIG. 5 illustrates an example process for a system implementing a ZTDNS for a system that includes a custom application DNS client in accordance with examples described herein.

FIG. 5 illustrates an example process 500 for a system implementing ZTDNS based networking for a computing device that includes a custom application DNS client in accordance with system diagram 400. In some examples, as a prerequisite for process 500, an administrator configures computing device 101 as a local DNS server to cause application DNS client 411 to provide requests to DNS listener 410. For example, application DNS client 411 is pre-configured to provide a DNS query to DNS client 406 (e.g., DNS listener 410). DNS client 406 then provides DNS queries to DNS server 102 to request domain name resolution of domain names into IP addresses.

At operation 502, filter driver 208 registers with filtering platform 209 to intercept all outbound IP-based connections, as discussed in operation 302 of FIG. 3. Upon registering with filtering platform 209, filter driver 208 is able to intercept outbound IP-based connections from computing device 101 (e.g., transmitted via TCP/IP stack 205). In at least one example, filter driver 208 may register with filtering platform 209 to intercept connections in addition to or different from outbound IP-based connections.

At operation 504, client application 204 provides a query, to application DNS client 411, requesting name resolution for a domain name for resource 203. In some examples, the query includes a message comprising a header and one or more sections. For instance, the message may include a question section, an answer section, and/or an authority section. The question section comprises fields that describe the query type, the query class, and the domain name for resource 203. The answer section comprises fields relating to one or more IP addresses corresponding to the domain name for resource 203. The authority section comprises the name of one or more authoritative name servers for a particular domain name zone.

At operation 506, application DNS client 411 attempts to provide the query to the local DNS server of computing device 101. For example, based on computing device 101 being configured as a local DNS server, application DNS client 411 adds the destination address of the local DNS server to one or more packets comprising the query and attempts to transmit the query to the destination address via TCP/IP stack 205.

At operation 508, DNS listener 410 intercepts the query (e.g., at TCP/IP stack 205). For example, DNS listener determines that the query involves an outbound IP-based connection based on one or more pattern matching techniques used to compare information associated with the query to a stored set of comparative information. Based on that determination, DNS listener 410 notifies DNS client 406 of the query. DNS client 406 then identifies the query in and/or extracts the query from TCP/IP stack 205. Alternatively, DNS listener 410 provides the query or an indication of the query to DNS client 406.

At operation 510, DNS client 406 proxies the query on behalf of the client application 204. For example, DNS client 406 retrieves the IP address for DNS server 102 (e.g., from a data store of computing device 101) and includes the domain name for resource 203 and the IP address for DNS server 102 in a proxy query. DNS client 406 then attempts to provide the proxy query to DNS server 102 using a DNS encryption protocol. Filter driver 208 intercepts the proxy query (e.g., at TCP/IP stack 405), as discussed in operation 308 of FIG. 3.

At operation 512, TCP/IP stack 205 provides the proxy query to DNS server 102 using the DNS encryption protocol upon approval from filter driver 208. DNS server 102 receives the proxy query from computing device 101 and determines whether the domain name in the proxy query corresponds to a trusted IP address and/or whether DNS server 102 is permitted to resolve the domain name, as discussed in operation 310 of FIG. 3.

At operation 514, DNS client 406 receives the response for the proxy query from DNS server 102. The response comprises the trusted IP address for resource 203. DNS client 406 calls filter driver 208 to add the trusted IP address for resource 203 to a storage location, as discussed in operation 312 of FIG. 3.

At operation 516, DNS listener 410 provides the trusted IP address for resource 203 to application DNS client 411. For example, DNS listener 410 may provide a DNS record received from DNS server 102 to application DNS client 411. The DNS record comprises, among other things, the trusted IP address for resource 203. Alternatively, DNS listener 410 may unpack the DNS record received from DNS server 102 to identify the trusted IP address for resource 203 and provide the unpacked trusted IP address to application DNS client 411.

At operation 518, application DNS client 411 provides the trusted IP address for resource 203 to client application 204. In examples, application DNS client 411 provides the DNS record received from DNS server 102 to client application 204. Alternatively, DNS client 411 provide the unpacked trusted IP address to client application 204.

At operation 520, client application 204 provides a query that attempts to access resource 203 using the trusted IP address. For example, in response to receiving the trusted IP address, client application 204 may generate a query requesting access to resource 203. In some examples, the query includes information in addition to the trusted IP address, such as a port number that identifies a particular application or service on a system, a security protocol to be applied the access request, or a user or device credential (e.g., a username, an account name, or a password) for authorizing and/or authenticating the user or device.

At 522, filter driver 208 intercepts the query attempting to access resource 203 (e.g., at TCP/IP stack 205). Filter driver 208 determines whether to allow the attempt to access resource 203, as discussed in operation 318 of FIG. 3. For example, filter driver 208 compares the query IP address for resource 203 with trusted IP addresses in a stored list of IP addresses. If the trusted IP address for resource 203 is determined to be listed in the stored list of IP addresses, filter driver 208 allows client application 204 to access resource 203. However, if the trusted IP address for resource 203 is determined to not be listed in the stored list of IP addresses, filter driver 208 prevents client application 204 from accessing resource 203.

At 524, client application 204 accesses resource 203 based on the determination of filter driver 208. For example, client application 204 may access and/or manipulate resource 203 on a remote computing device (e.g., a web server or a data repository). Alternatively, client application 204 may retrieve resource 203 (or a copy thereof), store retrieved resource 203 locally on computing device 101, and access and manipulate retrieved resource 203 locally. In examples in which resource 203 is a device or a piece of equipment, client application 204 may provide a set of instruction or commands to resource 203 to cause resource 203 to perform one or more actions (e.g., perform a print operation, a movement or relocation operation, a locking or unlocking operation, or an alerting operation).

Figure 6:
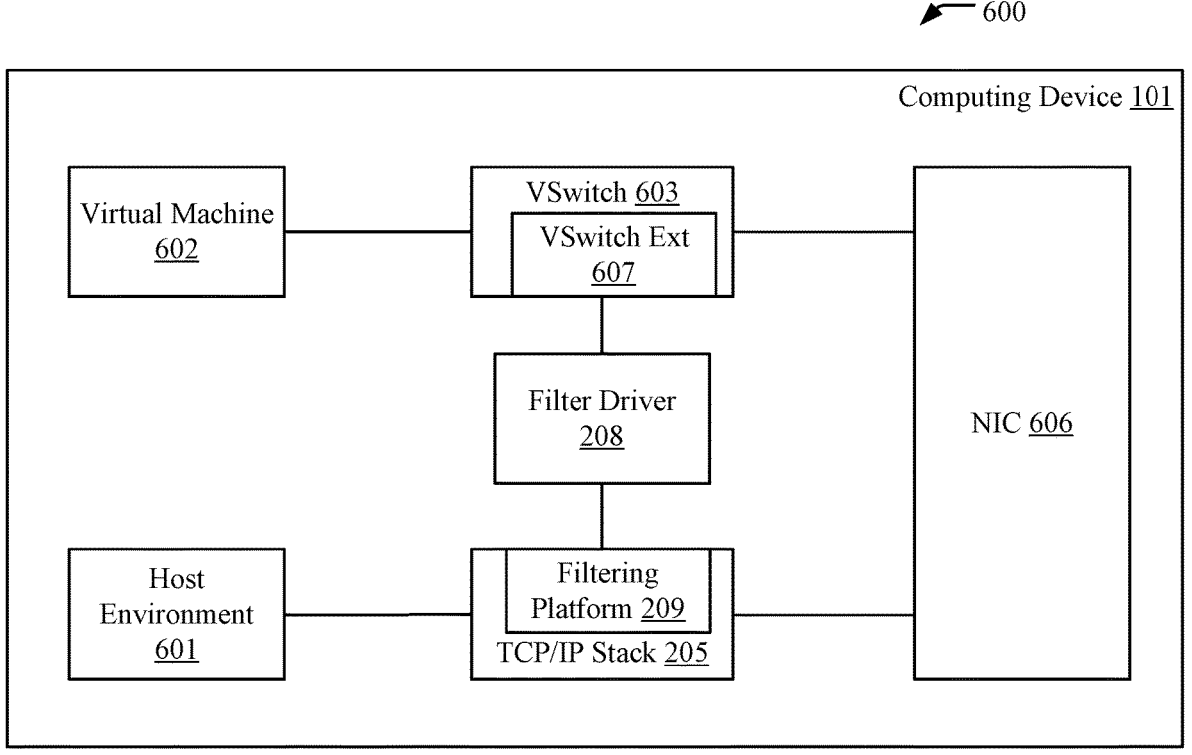
FIG. 6 illustrates an example system diagram for implementing ZTDNS based networking in systems that utilize virtual environments in accordance with examples described herein.

FIG. 6 illustrates an example system diagram 600 for implementing ZTDNS based networking in systems that utilize virtual environments. System diagram 600 includes computing device 101, which includes host environment 601, VM 602, VSwitch 603, filter driver 208, TCP/IP stack 205, and network interface card (NIC) 606. VSwitch 603 includes VSwitch extension 607. TCP/IP stack 205 includes filtering platform 209. In example, filter driver 208 is configured to intercept all outbound communications from VM 602, instead of intercepting only IP-based communications from VM 602.

Host environment 601 is a computing environment that provides software for performing various computing functions, such as executing host applications, virtual environments (e.g., VMs and containers), executing virtual environment monitoring software (e.g., a hypervisor), scheduling tasks, and controlling peripherals (e.g., microphones, touch-based sensors, geolocation sensors, accelerometers, optical/magnetic sensors, gyroscopes, keyboards, and pointing/selection tools). In examples, host environment 601 implements (e.g., hosts) VM 602.

VM 602 is a compute resource that uses software to execute and deploy services and applications. VM 602 may be provided access to physical resources of computing device 101 via virtual environment monitoring software of host environment 601. Examples of such physical resources include processing hardware (e.g., a central processing unit (CPU), a graphics processing unit (GPU), a video card), memory, persistent storage, and network interfaces (e.g., physical NICs and virtual NICs). In examples, VM 602 transmits DNS requests to a local DNS client of VM 602, transmits resource access requests to various computing devices inside or outside of the computing device 101, and/or accesses and manipulates requested resources.

VSwitch 603 is a software-based network switch that enables VM 602 to communicate with virtual networks and physical networks. For example, VSwitch 603 enables VM 602 to communicate with other VMs provided by host environment 601 and with resources external to host environment 601 and/or computing device 101.

NIC 606 is a component that connects computing device 101 to a virtual or a physical network. In examples, NIC 606 may represent a physical NIC or a virtual NIC. A physical NIC is a hardware component implemented by computing device 101, whereas a virtual NIC is software that emulates a physical NIC.

VSwitch extension 607 is software that notifies filter driver 208 when certain types of traffic are provided by VM 602. For example, VSwitch extension 607 notifies filter driver 208 when IP-based traffic from VM 602 is received at VSwitch 603.

FIG. 7 illustrates an example process 700 for implementing ZTDNS based networking in systems that utilize virtual environments in accordance with system diagram 600. In some examples, as a prerequisite for process 700, an administrator configures VM 602 to provide proxied DNS queries through host environment 601 using one or more proxy mechanisms. For example, a DNS client running on the VM 602 ("VM DNS client") provides queries (e.g., via sockets or other communication links) to a DNS client running on the host environment 601 (e.g., DNS client 206) ("host DNS client"). In other examples, the host DNS client runs a DNS listener (e.g., DNS listener 410) and VM 602 is configured (e.g., by an administrator) to use the DNS listener as a local DNS server for computing device 101.

At operation 702, VM 602 provides a DNS query requesting name resolution for a resource, such as resource 203. For example, VM 602 provides a DNS query comprising, among other things, a domain name for the resource to the VM DNS client. VM 602 may provide the DNS query using one or more service or applications available to VM 602. For instance, the DNS query may be provided in response to the domain name for the resource being entered into a web browser of VM 602 or being selected via a hyperlink.

At operation 704, VM 602 provides the DNS query to host environment 601 in accordance with at least one of the proxy mechanisms described previously. In examples, based on VM 602 being configured to provide proxied DNS queries through host environment 601, the VM DNS client provides the DNS query to the host DNS client. For instance, the VM DNS client may transmit the DNS query to the host DNS client over a specialized socket (or other communication link) for communicating between host environments and VMs executing in those host environments.

At operation 706, host environment 601 (e.g., via the host DNS client) provides the DNS query as a proxy query to a trusted DNS server (e.g., DNS server 102) using a DNS encryption protocol. For instance, the host DNS client attempts to provide the proxy query to a trusted DNS server via TCP/IP stack 205 and NIC 606. In examples, filter driver 208 intercepts the DNS query (e.g., at the TCP/IP stack 205), as discussed in operation 308 of FIG. 3.

At operation 708, the host DNS client receives a response to the proxy query from the trusted DNS server (e.g., via NIC 606 and TCP/IP stack 605). The response comprises the trusted IP address for the resource. The host DNS client calls filter driver 208 to add the trusted IP address for the resource to a list of trusted IP addresses stored by or accessible to filter driver 208 in a storage location of host environment

601. For instance, filter driver 208 stores the list of trusted IP addresses in a lookup table of a database located in host environment 601.

At operation 710, host environment 601 provides the trusted IP address for the resource to VM 602. In examples, the host DNS client provides the response to the VM DNS client in accordance with the one or more proxy mechanisms described above. For instance, the host DNS client may provide the response to the VM DNS client over a specialized socket (or other communication link) for communicating between host environments and VMs executing in those host environments. Alternatively, a DNS listener running on the host DNS client may detect the response from the trusted DNS server and may cause the host DNS client to provide the response to the VM DNS client. In both scenarios, the VM DNS client then provides the response to VM 602.

At operation 712, VM 602 attempts to access the resource using the trusted IP address for the resource. For example, in response to receiving the trusted IP address, VM 602 may generate a query requesting access to the resource. In some examples, the query includes information in addition to the trusted IP address, such as a port number that identifies a particular application or service on a system, a security protocol to be applied the access request, or a user or device credential (e.g., a username, an account name, or a password) for authorizing and/or authenticating the user or device. VM 602 then provides the query to VSwitch 603.

At operation 714, VSwitch extension 607 detects the query from VM 602. For example, VSwitch extension 607 may comprise listener functionality enabling VSwitch extension 607 to determine that the query involves an outbound connection from VM 602 based on one or more pattern matching techniques used to compare information associated with the query to a stored set of comparative information. Based on that determination, VSwitch extension 607 notifies filter driver 208 that the query has been received by VSwitch 603.

At operation 716, filter driver 208 intercepts the query attempting to access the resource. Filter driver 208 determines whether to allow the attempt to access the resource, as discussed in operation 318 of FIG. 3. For example, filter driver 208 compares the IP address in the query with trusted IP addresses in a stored list of IP addresses. If the trusted IP address for the resource is determined to be listed in the stored list of IP addresses, filter driver 208 allows VM 602 to access the resource. However, if the trusted IP address for the resource is determined to not be listed in the stored list of IP addresses, filter driver 208 prevents VM 602 from accessing the resource.

At operation 718, VM 602 accesses the resource based on the determination of filter driver 208. For example, VSwitch 603 provides the request to the resource via NIC 606. For example, VM 602 may access and/or manipulate the resource on a remote computing device (e.g., a web server or a data repository). Alternatively, VM 602 may retrieve the resource (or a copy thereof), store the retrieved resource locally on computing device 101, and access and manipulate the retrieved resource locally. In examples in which the resource is a device or a piece of equipment, VM 602 may provide a set of instruction or commands to the resource to cause the resource to perform one or more actions (e.g., perform a print operation, a movement or relocation operation, a locking or unlocking operation, or an alerting operation).

Figure 8:
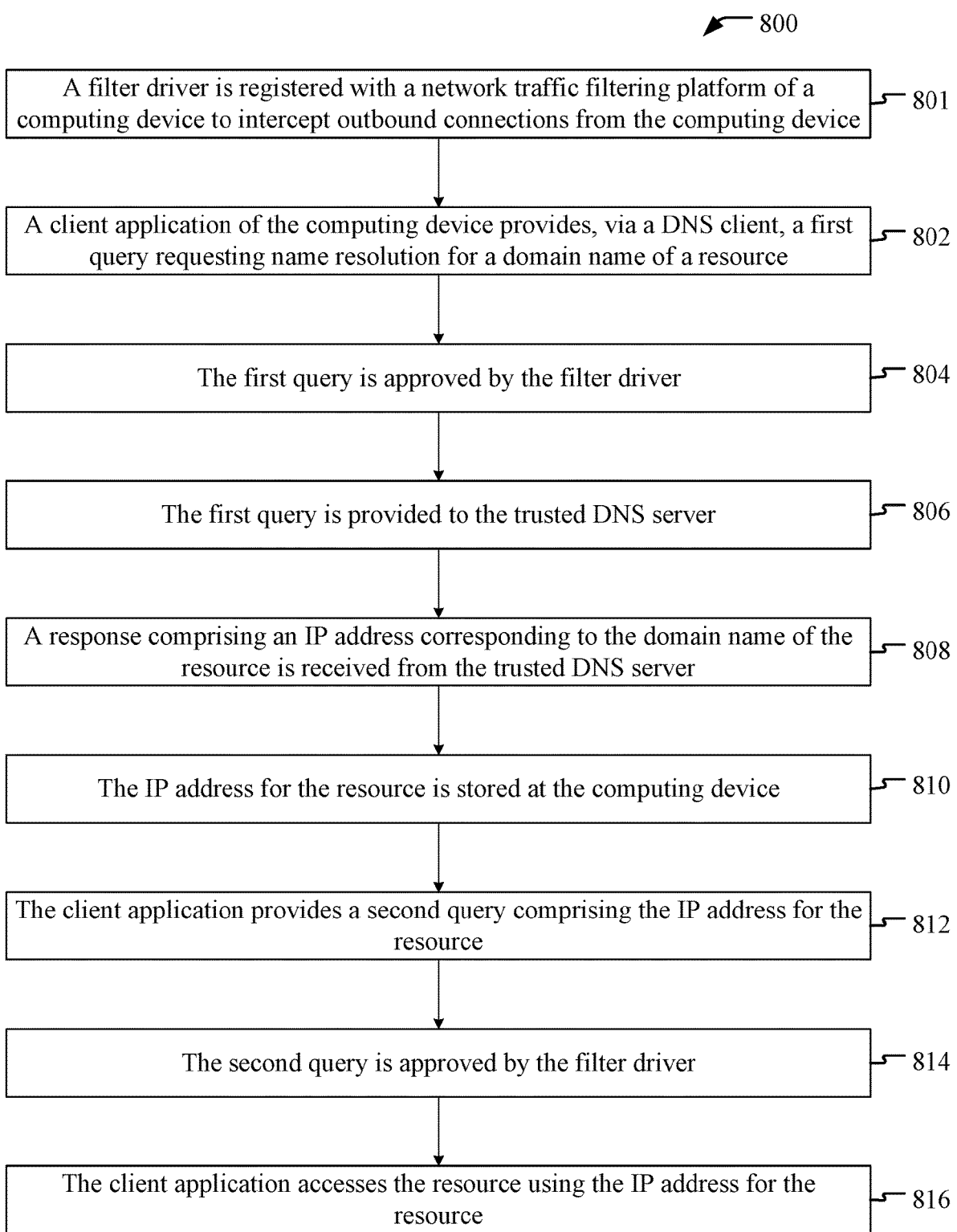
FIG. 8 illustrates a method flow for ZTDNS based networking in accordance with examples described herein.

FIG. 8 illustrates an example method for ZTDNS based networking. The method 800 may be performed by the systems described herein and/or the components of such systems. For instance, the method 800 may be performed by computing device 101 and/or the components thereof.

At operation 801, a filter driver (e.g., filter driver 208) may be registered with a network traffic filtering platform (e.g., filtering platform 209) of a computing device (e.g., computing device 101) to intercept outbound IP-based connections from the computing device.

At operation 802, a client application (e.g., client application 204) of the computing device provides, via a DNS client (e.g., DNS client 206), a first query requesting name resolution for a domain name of a resource (e.g., resource 203). In some examples, the DNS client accesses a local DNS cache to search for an IP address corresponding to the domain name of the resource. If the IP address for the resource is found in the DNS cache, the DNS client may provide the IP address to the computing device. If the IP address for the resource is not found in the DNS cache, the DNS client retrieves the IP address for a trusted DNS server (e.g., DNS server 102) and adds the IP address for the trusted DNS server to the first query.

At operation 804, the first query is approved by the filter driver. In examples, approving the first query comprises intercepting, by the filter driver, the first quest at a TCP/IP stack of the computing device (e.g., TCP/IP stack 205) and comparing the IP address in the first query (e.g., for the trusted DNS server) to a list of trusted IP addresses stored by or accessible to the filter driver. If the IP address in the first query matches an IP address in the list of trusted IP addresses, the filter driver approves the first request. However, if the IP address in the first query does not match an IP address in the list of trusted IP addresses, the filter driver disallows the first request.

At operation 806, the first query is provided to the trusted DNS server. In examples, the DNS query provided by the DNS client is transmitted to the trusted DNS server using a DNS encryption protocol, such as DoH, DoT, DoQ, or DNSCrypt.

At operation 808, a response comprising an IP address corresponding to the domain name of the resource is received from the trusted DNS server. In some examples, the response is provided as one or more DNS records comprising information related to the resource. The response is provided to the DNS client.

At operation 810, the IP address for the resource is stored at the computing device. For example, the DNS client provides the IP address for the resource to a software library (e.g., software library 207) of the computing device. The software library then provides the IP address for the resource to the filter driver to be stored in the list of trusted IP addresses. In examples, the DNS client also provides the IP address for the resource to the client application.

At operation 812, the client application provides a second query comprising the IP address for the resource. In examples, the second query is a request to access the resource. The DNS client receives the second query from the client application and attempts to transmit the second query to the resource.

At operation 814, the second query is approved by the filter driver. In examples, approving the second query comprises intercepting, by the filter driver, the second query at the TCP/IP stack and comparing the IP address in the second query (e.g., for the resource) to the list of trusted IP addresses stored by or accessible to the filter driver. If the IP address in the second query matches an IP address in the list of trusted IP addresses, the filter driver approves the second request. However, if the IP address in the second query does not match an IP address in the list of trusted IP addresses, the filter driver disallows the second request.

At operation 816, the client application accesses the resource using the IP address for the resource. In at least one example, the client application is required to satisfy one or more access requirements prior to being granted access to the resource. For instance, the client application (or a user accessing the client application) may have to satisfy an authorization process or an authentication process prior to accessing the resource.

Figure 9:
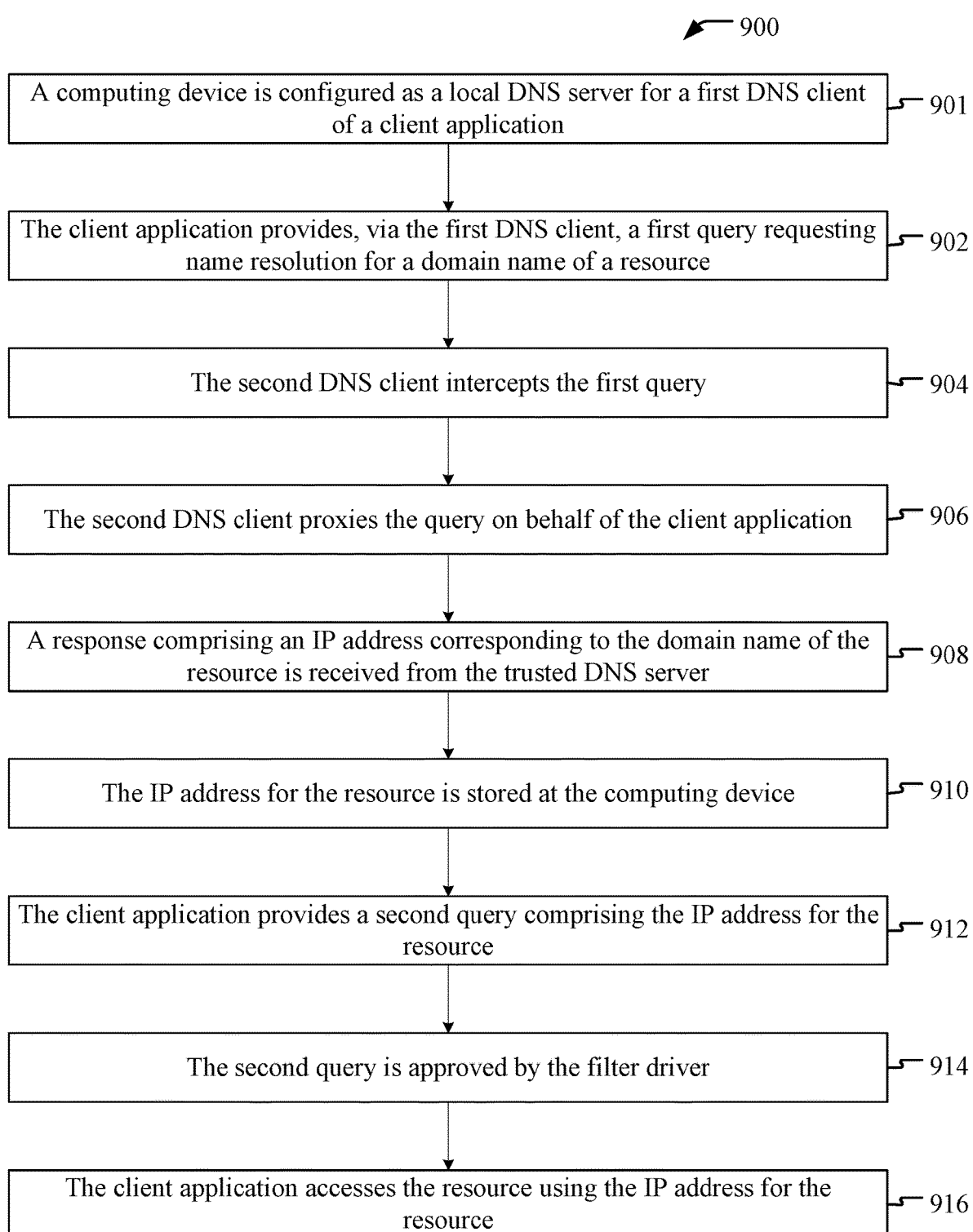
FIG. 9 illustrates a method flow for ZTDNS based networking for a system that includes a custom application DNS client in accordance with examples described herein.

FIG. 9 illustrates an example method for ZTDNS based networking for a system that includes a custom application DNS client. The method 900 may be performed by the systems described herein and/or the components of such systems. For instance, the method 900 may be performed by computing device 101 and/or the components thereof.

At optional operation 901, a computing device (e.g., computing device 101) is configured as a local DNS server for a first DNS client (e.g., application DNS client 411) of a client application (e.g., client application 204). For example, the first DNS client is pre-configured to provide DNS queries from the client application to a DNS listener (e.g., DNS listener 410) of a second DNS client (e.g., DNS client 406).

At operation 902, the client application provides, via the first DNS client, a first query requesting name resolution for a domain name of a resource (e.g., resource 203). The first DNS client attempts to transmit the first query to the local DNS server of the computing device.

At operation 904, the second DNS client intercepts the first query. For example, a DNS listener of the second DNS client intercepts the first query transmitted to the local DNS server at a TCP/IP stack of the computing device (e.g., TCP/IP stack 205).

At operation 906, the second DNS client proxies the query on behalf of the client application. For example, the second DNS client retrieves (e.g., from a data store of computing device 101) the IP address for a trusted DNS server (e.g., DNS server 102) and includes the domain name for the resource and the IP address for the trusted DNS server in a proxy query. The second DNS client then attempts to provide the proxy query to the trusted DNS server. The filter driver intercepts the proxy query (e.g., at TCP/IP stack 405) and compares the IP address of the trusted DNS server with a list of trusted IP addresses stored by or accessible to the filter driver. If the IP address of the trusted DNS server matches a stored IP address in the list of trusted IP addresses, the filter driver allows the connection to the trusted DNS server. However, if the IP address of the trusted DNS server does not match a stored IP address in the list of trusted IP addresses, the filter driver prevents the connection to the trusted DNS server. In examples, the proxy query is transmitted to the trusted DNS server using a DNS encryption protocol, such as DoH, DOT, DoQ, or DNSCrypt.

At operation 908, a response comprising an IP address corresponding to the domain name of the resource is received from the trusted DNS server. In some examples, the response is provided as one or more DNS records comprising information related to the resource. The response is provided to the second DNS client.

At operation 910, the IP address for the resource is stored at the computing device. For example, the second DNS client provides the IP address for the resource to a software library (e.g., software library 207) of the computing device. The software library then provides the IP address for the resource to the filter driver to be stored in the list of trusted IP addresses. In examples, the second DNS client also provides the IP address for the resource to the first DNS client, which provides the IP address for the resource to the client application.

At operation 912, the client application provides a second query comprising the IP address for the resource. In examples, the second query is a request to access the resource. The first DNS client receives the second query from the client application and attempts to transmit the second query to the resource.

At operation 914, the second query is approved by the filter driver. In examples, approving the second query comprises intercepting, by the filter driver, the second query at the TCP/IP stack and comparing the IP address in the second query (e.g., for the resource) to the list of trusted IP addresses stored by or accessible to the filter driver. If the IP address in the second query matches an IP address in the list of trusted IP addresses, the filter driver approves the second request. However, if the IP address in the second query does not match an IP address in the list of trusted IP addresses, the filter driver does not allow the second request.

At operation 916, the client application accesses the resource using the IP address for the resource. In at least one example, the client application is required to satisfy one or more access requirements prior to being granted access to the resource, as discussed in operation 816 of FIG. 8.

Figure 10:
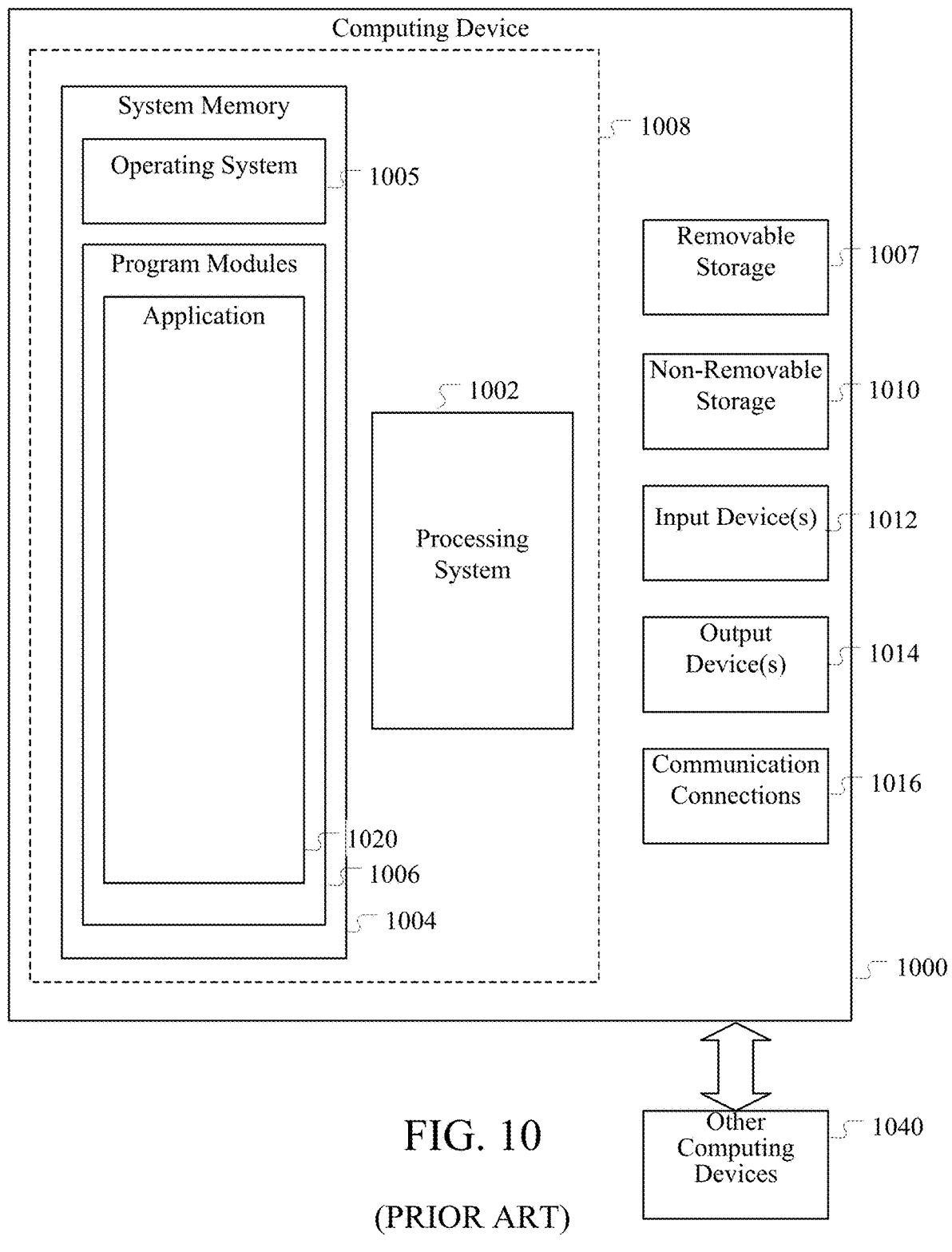
FIG. 10 illustrates a block diagram including physical components of a computing device 1000 in accordance with examples described herein.

FIG. 10 is a block diagram illustrating physical components (e.g., hardware) of a computing device 1000 with which aspects of the disclosure may be practiced. The computing device components described below may be suitable for the computing devices and systems described above. In a basic configuration, the computing device 1000 includes at least one processing system 1002 comprising processing unit(s) and a system memory 1004. Depending on the configuration and type of computing device, the system memory 1004 may comprise volatile storage (e.g., random access memory (RAM)), non-volatile storage (e.g., read-only memory (ROM)), flash memory, or any combination of such memories.

The system memory 1004 includes an operating system 1005 and one or more program modules 1006 suitable for running software application 1020, such as one or more components supported by the systems described herein. The operating system 1005, for example, may be suitable for controlling the operation of the computing device 1000.

Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, or optical disks. Such additional storage is illustrated in FIG. 10 by a removable storage device 1007 and a non-removable storage device 1010.

As stated above, a number of program modules and data files may be stored in the system memory 1004. While executing on the processing system 1002, the program modules 1006 (e.g., application 1020) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1007, and the non-removable storage device 1010 are all computer storage media examples (e.g., memory storage). Computer storage media may include RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

As will be understood from the foregoing disclosure, one example of the technology described herein relates to a system comprising: a processing system; and memory comprising executable instructions that when executed, perform operations comprising: providing, by a client application of a computing device of the system, a first query for a name resolution for a domain name of a resource; approving, by a filter driver, the first query; providing, to a DNS server, the first query; receiving, from the DNS server, a response comprising a first IP address corresponding to the domain name of the resource; storing the first IP address at the computing device; providing a second query to communicate with the resource, the second query comprising the first IP address; approving, by the filter driver, the second query based at least in part on the first IP address in the second query matching the stored first IP address; and transmitting information to the resource based at least in part on the approval of the second query.

In some examples, the filter driver is registered with a filtering platform to intercept all outbound IP-based communications from the computing device. In some examples, the approving the first query is based at least in part on a stored second IP address, the stored second IP address corresponding to the DNS server. In some examples, the providing the first query for the name resolution comprises providing the first query to a DNS client of the computing device. In some examples, the DNS client is configured to access a DNS cache and search for an IP address stored in the DNS cache corresponding to the domain name of the resource. In some examples, the providing, to the DNS server, the first query comprises providing, from a DNS client of the computing device and to the DNS server, the first query. In some examples, the first query is encrypted using a DNS over a DoH protocol. In some examples, the DNS server is a trusted DNS server. In some examples, storing the first IP address at the computing device comprises adding the first IP address to an internal lookup table. In some examples, the providing the second query to communicate with the resource comprises providing, by the client application, the second query, and wherein the providing the second query is based at least in part on receiving the first IP address from a DNS cache of the DNS client. In some examples, the storing the first IP address at the computing device comprises storing the first IP address in a storage element different from a DNS cache of the DNS client, and wherein the storage element is associated with the filter driver. In some examples, the transmitted information comprises an access query to access the resource. In some examples, the operations further comprise: providing, from the DNS client to a software library, the first IP address based at least in part on receiving, from the DNS server, the response. In some examples, the operations further comprise: providing, from the software library to the filter driver, the first IP address, wherein the filter driver is configured to store the first IP address at the computing device. In some examples, the software library comprises a DLL.

In some examples, technology described herein includes a method, comprising: providing, from a client application of a computing device to a first DNS client of the client application, a DNS query for a resource, the DNS query comprising a domain name for the resource; intercepting, by a second DNS client, the DNS query; providing a proxy query to a DNS server based at least in part on the intercepting; receiving, from the DNS server, a response comprising an IP address corresponding to the domain name of the resource; storing the IP address at the computing device; providing a second query to communicate with the resource; approving the second query based at least in part on the stored IP address; and transmitting information to the resource based at least in part on the approval of the second query.

In some examples, the method further comprises: providing the DNS query from the first DNS client to a TCP/IP stack. In some examples, the DNS query is intercepted at a TCP/IP stack. In some examples, the first DNS client is pre-configured to provide the DNS query to the second DNS client.

In some examples, the technology described herein includes a device comprising: a processing system; and memory coupled to the processing unit, the memory comprising computer executable instructions that, when executed by the processing unit, perform operations comprising: providing, by a client application of a computing device via a DNS client, a first query for a name resolution for a domain name of a resource; approving, by a filter driver, the first query; providing, to a DNS server, the first query; receiving, from the DNS server, a response comprising a first IP address corresponding to the domain name of the resource; storing the first IP address at the computing device; providing a second query to communicate with the resource, the second query comprising the first IP address; approving, by the filter driver, the second query based at least in part on the first IP address in the second query matching the stored first IP address; and transmitting information to the resource based at least in part on the approval of the second query.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   a processing system; and
   memory comprising executable instructions that when executed, perform operations comprising:

providing, by a client application of a computing device of the system, a first query for a name resolution for a domain name of a resource;

approving, by a filter driver of the computing device, the first query based on a stored first internet protocol (IP) address corresponding to a domain name system (DNS) server, wherein the filter driver is registered with a filtering platform implemented by a Transmission Control Protocol/Internet Protocol (TCP/IP) stack of the computing device to intercept, at the TCP/IP stack, outgoing communications from the computing device;

providing, to the DNS server, the first query;

receiving, from the DNS server, a response comprising a second IP address corresponding to the domain name of the resource;

storing the second IP address at the computing device by providing, from a DNS component associated with the client application, the second IP address to a software library comprising application programming interface wrappers around one or more input/output controls that communicate with the filter driver;

providing a second query to communicate with the resource, wherein the second query comprises the second IP address and is provided in response to receiving the second IP address from a client cache of the computing device;

approving, by the filter driver, the second query based at least in part on the second IP address in the second query matching the stored second IP address; and transmitting information to the resource based on approval of the second query.

2. The system of claim 1, wherein the providing, by the client application, the first query for the name resolution comprises providing the first query to a DNS client of the computing device.

3. The system of claim 2, wherein the DNS client is configured to access a DNS cache and search for an IP address stored in the DNS cache corresponding to the domain name of the resource.

4. The system of claim 1, wherein the providing, to the DNS server, the first query comprises providing the first query from a DNS client of the computing device to the DNS server.

5. The system of claim 4, wherein the first query is encrypted using at least one of:

DNS over Hypertext Transfer Protocol Secure;

DNS over Transport Layer Security;

DNS over Quick User Datagram Protocol Internet Connections; or

DNSCrypt.

6. The system of claim 1, wherein the DNS server is trusted based on a certificate stored on the computing device to verify identity of the DNS server.

7. The system of claim 1, wherein storing the second IP address at the computing device comprises adding the second IP address to an internal lookup table.

8. The system of claim 1, wherein the storing the second IP address at the computing device comprises storing the second IP address in a storage element associated with the filter driver.

9. The system of claim 1, wherein the transmitted information comprises an access query to access the resource.

10. The system of claim 1, the operations further comprising:

providing, from the software library to the filter driver, the second IP address, wherein the filter driver is configured to store the second IP address at the computing device.

11. A method, comprising:

providing, from a client application of a computing device to a first domain name system (DNS) client of the client application, a DNS query for a resource, the DNS query comprising a domain name for the resource;

intercepting, by a second DNS client of the computing device, the DNS query;

generating a proxy query representing the DNS query based at least in part on the intercepting;

approving, by a filter driver of the computing device, the proxy query based on a stored first IP address corresponding to a DNS server, wherein the filter driver is registered with a filtering platform implemented by a Transmission Control Protocol/Internet Protocol (TCP/IP) stack of the computing device to intercept, at the TCP/IP stack, outgoing communications from the computing device;

providing the proxy query to the DNS server;

receiving, from the DNS server, a response comprising a second IP address corresponding to the domain name of the resource;

storing the second IP address at the computing device by providing, from the second DNS client, the second IP address to a software library comprising application programming interface wrappers around one or more input/output controls that communicate with the filter driver;

providing, from the client application, a second query to communicate with the resource, wherein the second query is provided in response to receiving the second IP address from a client cache of the computing device;

approving the second query based on the stored second IP address; and transmitting information to the resource based on approval of the second query.

12. The method of claim 11, wherein the computing device is provisioned with a digital certificate enabling the computer device to verify identity of the DNS server.

13. The method of claim 11, wherein intercepting the DNS query comprises intercepting the DNS query at the TCP/IP stack of the computing device.

14. The method of claim 11, wherein storing the second IP address at the computing device further comprises:

providing, from the software library, the second IP address to the filter driver; and storing, by the filter driver, the second IP address in a data store of the computing device.

15. The method of claim 11, wherein the first DNS client is pre-configured to provide the DNS query to the second DNS client.

16. A device comprising:

a processing system; and memory coupled to the processing system, the memory comprising computer executable instructions that, when executed, perform operations comprising:

providing, by a client application of a computing device via a domain name system (DNS) client component, a first query for a name resolution for a domain name of a resource;

approving, by a filter driver of the device, the first query based on a stored first internet protocol (IP) address corresponding to a DNS server, wherein the filter driver is registered with a filtering platform implemented by a Transmission Control Protocol/Internet Protocol (TCP/IP) stack of the computing device to intercept, at the TCP/IP stack, outgoing communications from the computing device;

providing, to the DNS server, the first query;

receiving, from the DNS server, a response comprising a first internet protocol (second IP address corresponding to the domain name of the resource;

storing the second IP address at the computing device by providing, from the DNS component, the second IP address to a software library comprising application programming interface wrappers around one or more input/output controls that communicate with the filter driver;

providing the second IP address to the client application;

providing a second query to communicate with the resource, wherein the second query comprising comprises the second IP address and is provided in response to receiving the second IP address from a client cache of the computing device;

approving, by the filter driver, the second query based on the second IP address in the second query matching the second IP address stored at the computing device; and accessing the resource using the second IP address.

17. The device of claim 16, wherein the DNS component is a DNS client of the computing device.

18. The device of claim 16, wherein the DNS component is configured to access the client cache to search for the second IP address.

\* \* \* \* \*